(12) United States Patent
Barden et al.

(10) Patent No.: US 12,160,159 B2
(45) Date of Patent: Dec. 3, 2024

(54) COOLING A ROTATING ELECTRICAL MACHINE

(71) Applicant: Cummins Inc., Columbus, IN (US)

(72) Inventors: Richard Matthew Barden, Columbus, IN (US); Krzysztof Paciura, Columbus, IN (US)

(73) Assignee: Cummins Inc., Columbus, IN (US)

( * ) Notice: Subject to any disclaimer, the term of this patent is extended or adjusted under 35 U.S.C. 154(b) by 257 days.

(21) Appl. No.: 17/697,233

(22) Filed: Mar. 17, 2022

(65) Prior Publication Data

US 2022/0302795 A1    Sep. 22, 2022

(30) Foreign Application Priority Data

Mar. 18, 2021  (GB) ..................................... 2103793

(51) Int. Cl.
*H02K 9/19*  (2006.01)
*H02K 1/32*  (2006.01)
(Continued)

(52) U.S. Cl.
CPC ................. *H02K 9/19* (2013.01); *H02K 1/32* (2013.01); *H02K 5/20* (2013.01); *H02K 7/006* (2013.01)

(58) Field of Classification Search
CPC .. H02K 9/19; H02K 1/32; H02K 5/20; H02K 7/006
See application file for complete search history.

(56) References Cited

U.S. PATENT DOCUMENTS 3,260,872 A    7/1966   Potter
5,365,133 A    11/1994  Raad
(Continued)

FOREIGN PATENT DOCUMENTS

CN    104037983 A  *  9/2014   .............. H02K 5/20
DE    19824202 C1     9/1999
(Continued)

OTHER PUBLICATIONS

CN-104037983-A_translate (Year: 2014).*
(Continued)

*Primary Examiner* — Tulsidas C Patel
*Assistant Examiner* — Mohammed Ahmed Qureshi
(74) *Attorney, Agent, or Firm* — Faegre Drinker Biddle & Reath LLP

(57) ABSTRACT

A rotating electrical machine is disclosed, the machine comprising a stator comprising a stator core and stator end windings extending out of the stator core, a rotor arranged to rotate inside the stator, a rotor shaft, the rotor shaft having a hollow interior, a coolant circuit for circulating coolant through the machine, and a machine enclosure. The coolant circuit comprises an injection tube arranged to introduce coolant into the hollow interior of the rotor shaft. The rotor shaft is arranged such that coolant exits the hollow interior of the rotor shaft at each end of the machine and is propelled outwards towards the stator end windings. The machine enclosure comprises a passageway for supplying coolant to the injection tube. A coolant distribution channel may be provided for distributing coolant to other parts of the machine to allow the machine to be cooled at multiple locations using the same coolant circuit.

17 Claims, 7 Drawing Sheets

(51) Int. Cl.
  *H02K 5/20* (2006.01)
  *H02K 7/00* (2006.01)

(56) References Cited

U.S. PATENT DOCUMENTS

| | | |
|---|---|---|
| 7,397,154 B2 | 7/2008 | Tilton et al. |
| 9,762,106 B2 | 9/2017 | Gauthier et al. |
| 2008/0272661 A1* | 11/2008 | Zhou ................ H02K 9/197 |
| | | 310/61 |
| 2016/0164377 A1 | 6/2016 | Gauthier et al. |
| 2016/0164378 A1* | 6/2016 | Gauthier ............ H02K 9/19 |
| | | 310/54 |
| 2020/0186003 A1 | 6/2020 | Frohlich |
| 2020/0227964 A1* | 7/2020 | Ronning ............ H02K 1/32 |

FOREIGN PATENT DOCUMENTS

| | | |
|---|---|---|
| DE | 102018221569 A1 | 6/2020 |
| DE | 102020007864 | 3/2021 |
| JP | 2020162198 | 10/2020 |
| KR | 20120089758 A | 8/2012 |
| WO | WO-2015098328 A1 * | 7/2015 ............ H02K 5/20 |
| WO | 2018184327 A1 | 10/2018 |
| WO | 2018225877 A1 | 12/2018 |
| WO | 2019032686 A1 | 2/2019 |

OTHER PUBLICATIONS

WO-2015098328-A1_translate (Year: 2015).*
UK Search Report for GB Patent Application No. 2103793.2, mailed Jul. 14, 2021.

* cited by examiner

COOLING A ROTATING ELECTRICAL MACHINE

FIELD OF THE DISCLOSURE

The present disclosure relates to techniques for cooling a rotating electrical machine, and in particular, but not exclusively, a rotating electrical machine for use in traction applications such as electric and hybrid electric vehicles.

BACKGROUND

Rotating electrical machines generally comprise a rotor arranged to rotate inside a stator. Permanent magnets or windings on the rotor produce a magnetic flux between the rotor and the stator. The stator is provided with stator windings which intersect the magnetic flux. In the case of motor operation, a commutated electrical current is applied to the stator windings. The applied current creates a magnetic flux which interacts with the rotor flux causing the rotor to rotate. In the case of generator operation, rotation of the rotor produces an electrical output in the stator windings.

When the machine is in operation, the electrical current through the stator windings may cause the windings to heat. Furthermore, the changing magnetic flux can cause the magnets in the rotor to heat. To ensure efficient operation of the machine and to prevent damage or failure, the temperature of the machine therefore needs to be controlled.

A number of different techniques have been proposed for cooling rotating electrical machines. For example, U.S. Pat. No. 6,191,511, the subject matter of which is incorporated herein by reference, discloses a closed loop, liquid cooling circuit, the cooling circuit passing the coolant through both the stator and a hollow rotor shaft. The coolant is pumped through an injection tube to the end of the rotor shaft where it is driven back between the injection tube and the hollow rotor. The coolant then passes through a cylindrical cooling chamber extending over the stator before being returned to the injection tube.

US Publication No. 2016/0164377, the subject matter of which is incorporated herein by reference, discloses a motor assembly with an integrated cooling system comprising a stator contained within a motor enclosure, a rotor shaft passing between a first end cap and a second end cap of the motor enclosure, and a rotor mounted to the rotor shaft, the rotor shaft including a hollow region. A coolant such as oil is injected into one end of the hollow rotor shaft. The coolant flows through the hollow region of the shaft and is expelled at the other end of the shaft into the motor enclosure via through-holes. This can allow both the stator and the rotor assemblies to be cooled.

It has been found that known cooling techniques such as those discussed above may suffer from limited and/or uneven withdrawal of heat. Attempts to overcome such disadvantages have tended to result in complex cooling circuits requiring multiple cooling channels and/or multiple cooling nozzles located at various positions around the machine, which may add to the size, cost and complexity of the machine.

It would therefore be desirable to provide a rotating electrical machine in which cooling can be carried out evenly and effectively, while avoiding the need for a complex cooling circuit and multiple injection points.

SUMMARY

According to one aspect of the present disclosure there is provided a rotating electrical machine comprising:

a stator comprising a stator core and stator end windings extending out of the stator core;
a rotor arranged to rotate inside the stator;
a rotor shaft, the rotor shaft having a hollow interior;
a coolant circuit for circulating coolant through the machine; and
a machine enclosure;
wherein the coolant circuit comprises an injection tube arranged to introduce coolant into the hollow interior of the rotor shaft,
the rotor shaft is arranged such that coolant exits the hollow interior of the rotor shaft at each end of the machine and is propelled outwards towards the stator end windings, and
the machine enclosure comprises a passageway for supplying coolant to the injection tube.

The present disclosure may provide the advantage that, by arranging the machine such that coolant exits the hollow interior of the rotor shaft at each end (axially) of the machine, it may be possible to cool both the rotor and the stator, and to cool both ends of the machine, using the same coolant circuit. Furthermore, this may be achieved using a single injection point for the coolant. Thus, the present disclosure may allow cooling to be carried out evenly and effectively, while avoiding the need for a complex cooling circuit and multiple injection points. This in turn may allow the machine to fit within a smaller space envelope, thus providing a more compact arrangement.

In one embodiment the machine is arranged such that coolant which has exited the hollow interior cools at least a part of the stator, such as stator end windings, at each end of the machine. This may help to ensure that both ends of the machine are cooled, thereby contributing to a more even withdrawal of heat from the machine.

In one embodiment the injection tube is arranged to introduce coolant into the center, axially, of the hollow interior. For example, the injection tube may be arranged to introduce coolant at a position lying greater than 10%, 20%, 30% or 40% and/or less than 90%, 80%, 70% or 60% of the way through the machine axially. This may be measured, for example, with respect to end faces of the rotor and/or stator (i.e. the faces at the ends of the rotor and/or stator in an axial direction). This may allow coolant to flow from the center of the hollow interior towards each end of the machine, and thus may allow coolant to exit the hollow interior of the rotor shaft at each end of the machine.

The injection tube may extend axially into the center of the hollow interior. For example, the injection tube may extend from one end of the machine to the center of the machine. Alternatively, the tube may extend beyond the center, or through the whole through the hollow interior. In any of these arrangements, the injection tube may comprise at least one outlet, which may be arranged to introduce coolant into the center, axially, of the hollow interior. In one embodiment the hollow interior forms a single chamber for coolant exiting both ends of the machine.

In one embodiment the injection tube is located at the center of the machine radially. This can allow coolant to be injected into the center of the hollow interior.

In one embodiment the injection tube is non-rotating, which may avoid the need for a rotating seal. For example, the injection tube may be connected to part of the machine enclosure, such as an end plate of the machine.

In one embodiment the injection tube comprises at least one outlet which is arranged to direct coolant radially outwards into the hollow interior of the shaft. The coolant may be directed through the hollow interior towards an internal surface of the shaft. An air gap may be provided between the tube and the internal surface of the shaft. Thus, rather than the shaft being filled with coolant, coolant may instead flow from the tube through the air gap to the internal surface. This may reduce the amount of coolant needed inside the shaft and thus reduce the rotating mass and/or allow the coolant to flow at a more radially outwards position and thus closer to the rotor magnets than might otherwise be the case. If desired, the injection tube may comprise one or more nozzles for directing and/or controlling the flow of coolant.

In one embodiment the machine is arranged such that coolant flows (axially) along an internal surface of the rotor shaft, rather than through the whole of the hollow interior. This may reduce the amount of coolant needed inside the shaft and/or allow the coolant to flow at a more radially outwards position.

In one embodiment the machine is arranged to produce bidirectional flow of coolant through the hollow interior of the rotor shaft. For example, the machine may be arranged to allow coolant to flow from the center of the hollow interior towards each end of the machine in a substantially axial direction.

In one embodiment, the internal surface is arranged such that coolant is propelled from the center of the machine towards each end of the machine under centrifugal force. Thus, rotation of the rotor may provide at least part of the force which causes the coolant to circulate through the machine.

In order to facilitate low of coolant though the rotor shaft, the rotor shaft may have an interior surface with a taper. This can allow coolant to be forced through the hollow interior under centrifugal force as the rotor rotates. The taper may be symmetrical, that is, the interior surface may taper in each direction away from the center of the hollow interior. The amount of taper may be the same in each direction, or different.

In one embodiment the interior surface tapers radially outwards in a direction from the center of the machine towards each end of the machine axially. Thus, the interior surface may be tapered such that the rotor shaft has an internal radius which is smaller at the center of the machine than at each end of the machine. The interior surface may be for example substantially frustoconical from the center of the machine towards the end of the machine in each direction. However, it would also be possible for the interior surface to have a certain degree of curvature.

In one embodiment the rotor shaft comprises at least one through hole from the hollow interior to outside the shaft at each end of the machine. Each through hole may allow fluid communication between the hollow interior of the rotor shaft and the stator. The through hole may run in a substantially axial direction, which may help to minimize the size of the rotor and/or the rotational mass. However, it would also be possible for the through hole to have a radial component or to run in a substantially radial direction. In one embodiment a plurality of through holes are provided at each end of the machine. This can allow coolant which has passed through the shaft to exit the shaft and contact parts of the stator, such as stator end windings, thereby cooling both the rotor and the stator.

The machine is arranged such that coolant exiting the hollow interior of the rotor shaft is propelled radially outwards. This can allow the coolant to come into contact with parts of the stator such as stator end windings. In one embodiment the coolant is propelled outwards under centrifugal force as the rotor rotates. Thus, rotation of the rotor may provide at least part of the propelling force.

The stator comprises a stator core and end windings extending out of the stator core. Coolant exiting the hollow interior of the rotor shaft may be propelled towards the stator end windings. For example, the coolant may be propelled towards the radially inwards side of the stator end windings. This can allow the end windings and thus the stator to be cooled using the same coolant circuit as is used to cool the rotor.

In one embodiment the rotor is mounted on the rotor shaft, and the rotor is located inside the stator with an airgap between the two. In one embodiment the rotor is arranged to rotate inside the stator. The rotor may comprise a rotor core and a plurality of permanent magnets, or rotor windings.

The machine enclosure may comprise, for example, a machine housing and/or end plates. The machine housing may be a one-part housing or a two-part housing or may have any other number of parts. The housing and/or end plates may hold bearings which support the rotor shaft.

The machine may be arranged such that coolant exits the hollow interior of the rotor shaft into an interior of the enclosure. The enclosure may be a sealed enclosure, and the coolant may be contained by the enclosure. Thus, the enclosure may form part of a closed coolant circuit.

The enclosure comprises a passageway for supplying coolant to the injection tube. For example, the passageway may pass through a machine housing and/or an end plate. The passageway may introduce coolant into the injection tube.

The enclosure may comprise at least one coolant distribution channel for distributing coolant to other parts of the machine (as well as the hollow interior of the rotor shaft). The coolant distribution channel may be part of the same coolant circuit as the injection tube. The coolant distribution channel may run circumferentially around the machine. For example, the machine enclosure may comprise an inner housing which may be arranged to hold the electrical machine, and an outer housing which may be arranged to fit around the inner housing, and one or more coolant distribution channels may be formed between the inner housing and the outer housing. The coolant distribution channel may for example supply coolant to one or more outlets which may be used to direct coolant to a radially outwards side and/or axially outwards side of the stator end windings. This may allow both sides of the stator end windings to be cooled using the same coolant circuit.

The machine may further comprise at least one further passageway between the coolant distribution channel and each outlet. The least one further passageway may be formed in the machine enclosure, such as through an outer housing and/or end plate. The outlet may be, for example, a nozzle or the opening of a passageway.

In one embodiment, at least one passageway (for example, the passageway for supplying coolant to the injection tube and/or a passageway between the coolant distribution channel and an outlet) is at least partially formed by drilling through the machine enclosure. This may simplify manufacture by allowing the passageways to be drilled into an enclosure which has already been formed, for example, by casting. If desired or necessary, an end of at least one passageway may be sealed with a plug.

The enclosure may comprise a further cooling channel for cooing the machine, and the machine may be arranged such that coolant flows through the further cooling channel. For example, the further cooling channel may be formed between an inner housing and an outer housing. The further cooling channel may be part of a different coolant circuit from that of the rotor and stator and/or may use a different coolant. Alternatively, the cooling channel could be part of the same coolant circuit and/or use the same coolant.

The machine may further comprise a sump for collecting coolant which has circulated through the machine. For example, the sump may collect coolant which is inside the machine's enclosure. The coolant may fall to the sump, for example, under the force of gravity. However, rather than a sump, any other appropriate conduit or reservoir for collecting the coolant may be used instead.

The machine may further comprise a pump for pumping coolant through the machine. The pump may be an external pump, and may be driven electrically or mechanically, or it may be an internal pump driven by rotation of the rotor, or any other type of pump. A control unit may be provided for controlling the speed of the pump. The speed of the pump may be controllable to ensure that a desired amount of coolant is introduced into the hollow interior of the rotor shaft, for example, to prevent the hollow interior from filling with coolant. Alternatively or in addition the speed of the pump may be controllable in dependence on operating conditions of the machine, such as speed of the machine and/or load applied to the machine.

If desired, the machine may also include a filter for filtering contaminants from the coolant, and/or a heat exchanger for removing heat from the coolant prior to recirculation back into the machine.

In one embodiment the coolant is a liquid coolant such as oil or a water-glycol mix, although any other appropriate type of coolant could be used instead.

In one embodiment the machine is for use in the drivetrain of a vehicle. However, the machine may be used in other applications such as power generation.

Corresponding methods may also be provided. Thus, according to another aspect of the disclosure there is provided a method of cooling a rotating electrical machine, the machine comprising a stator with stator end windings, a rotor, a rotor shaft, the rotor shaft having a hollow interior, a coolant circuit for circulating coolant through the machine, and a machine enclosure, the method comprising: supplying coolant to an injection tube through a passageway in the machine enclosure; introducing coolant into the hollow interior of the rotor shaft through the injection tube; and causing coolant to flow through the hollow interior of the rotor shaft, to exit the hollow interior at each end of the machine, and to be propelled outwards towards the stator end windings.

Features of one aspect of the disclosure may be provided with any other aspect. Apparatus features may be provided with method aspects and vice versa.

In the present disclosure, terms such as "radially", "axially" and "circumferentially" are generally defined with reference to the axis of rotation of the rotating electrical machine unless the context implies otherwise.

BRIEF DESCRIPTION OF THE DRAWINGS

Exemplary embodiments of the present disclosure will now be described, purely by way of example, with reference to the accompanying drawings, in which.

DETAILED DESCRIPTION OF EMBODIMENTS OF THE DISCLOSURE

Figure 1:
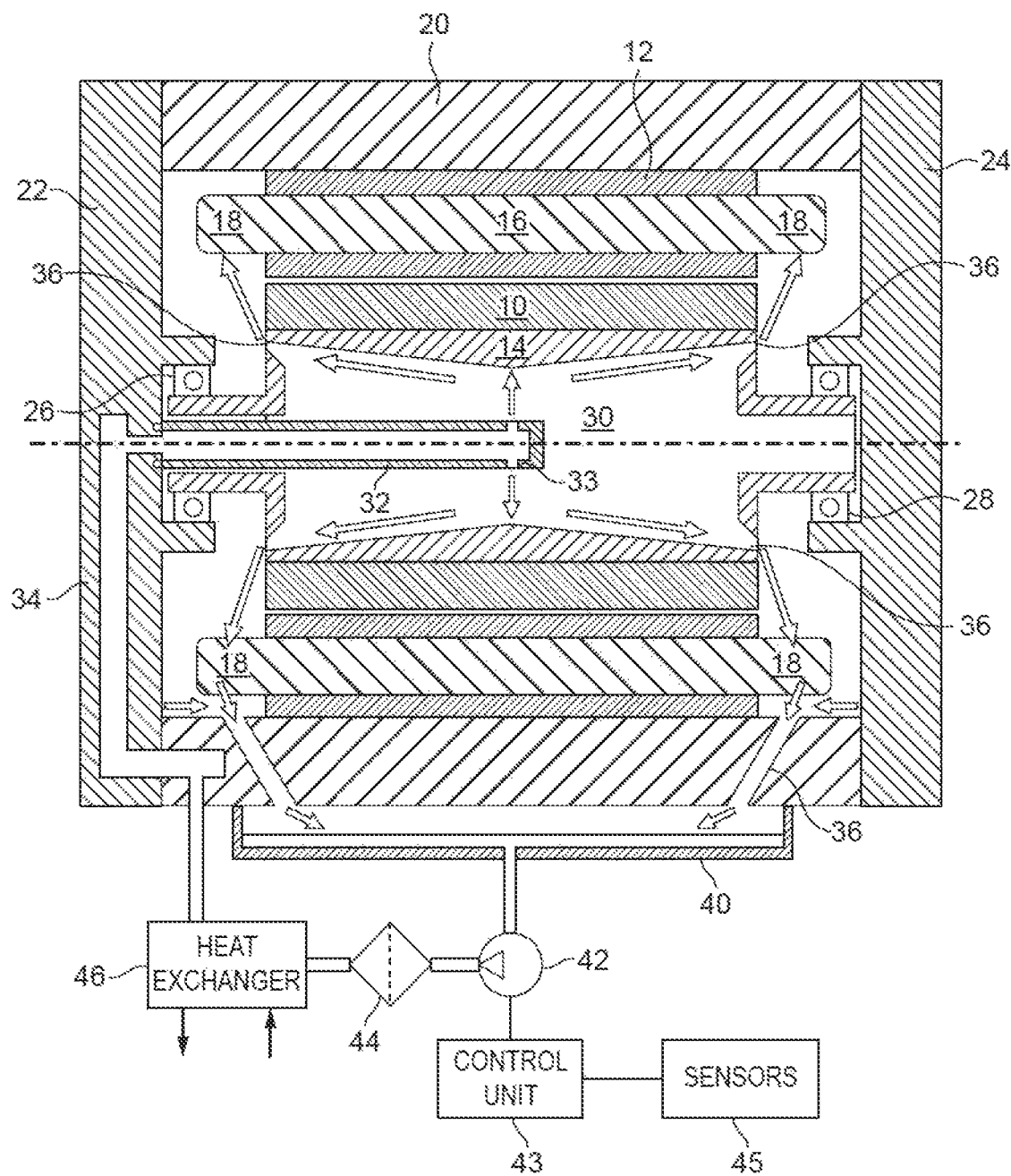
FIG. 1 shows parts of a rotating electrical machine in an embodiment of the disclosure.

FIG. 1 shows parts of a rotating electrical machine in an embodiment of the disclosure. Referring to FIG. 1, the machine comprises a rotor 10 located inside a stator 12 with an air gap between the two. The rotor 10 comprises a rotor core which holds a plurality of permanent magnets. The rotor core has an end face at each end, axially, of the machine. The rotor 10 is mounted on a rotor shaft 14. The stator 12 comprises a stator core with slots on its inner circumference in which are wound stator windings. The stator core comprises an end face at each end, axially, of the machine. The stator windings comprise side windings 16 which run through the slots in a substantially axial direction, and end windings 18 which extend out of the stator slots at each end of the machine and pass around the end face of the stator core in a substantially circumferential direction.

The machine is contained within a housing 20. A first end plate 22 is attached to the housing 20 at one end of the machine, and a second end plate 24 is attached to the housing at the other end of the machine. The housing 20 together with the end plates 22, 24 provide a sealed enclosure for the machine. The stator 12 is held in place by the housing 20. The end plates 22, 24 hold bearings 26, 28, which are used to support the rotor shaft 14. The bearings 26, 28 allow the rotor shaft 14 and the rotor 10 to rotate inside the stator 12 about an axis of rotation as indicated by the dotted and dashed line. A coupling (not shown) is provided for coupling the rotor to other rotating components such as a vehicle transmission.

In the arrangement of FIG. 1, the rotor shaft 14 has a central portion with a hollow interior 30 which extends axially though the center of the machine. The hollow interior 30 is located radially inwards of the rotor 10. The hollow interior 30 forms a chamber which allows coolant to flow through the shaft, in order to cool the rotor. The rotor shaft 14 also includes end portions with a smaller radius than the central portion, and which are supported by the bearings 26, 28. At least one of the end portions is hollow.

Coolant is introduced into the hollow interior 30 of the rotor shaft by means of an injection tube 32. The injection tube 32 is connected to the end plate 22 at one end and passes through the center of one of the end portions of the rotor shaft. The injection tube 32 is located at the center of the machine radially and extends axially into the hollow interior 30 of the rotor shaft 14. In the arrangement shown, the injection tube extends axially through the hollow interior to point just over half-way through the machine. As the tube 32 is connected to the end plate 22, it does not rotate. A small air gap between the tube 32 and the end portion of the shalt 14 allows the shaft to rotate about the tube. A passageway 34 through the end plate 22 allows coolant to enter the tube 32.

The end of the tube 32 in the hollow interior of the rotor shaft is sealed. Radial holes 33 are provided through the tube at positions roughly at the center (axially) of the machine. The radial holes 33 provide exit paths for coolant flowing inside the tube 32. The radially holes are arranged to direct coolant radially outwards, inside the hollow interior 30 of the rotor shaft. The internal radius of the hollow interior 30 is larger than the external radius of the tube 32, and thus coolant is injected into an air gap between the tube 32 and an internal surface of the hollow interior 30. If desired, one or more nozzles could be provided at the end of the tube, in order to control the direction and characteristics of the flow of coolant.

Still referring to FIG. 1, it can be seen that the internal surface of the hollow interior 30 of the rotor shaft 14 has a symmetrical taper. Thus, the internal surface tapers outwards radially and axially from a position at the center of the machine (axially) towards each end of the machine. As a consequence, the internal radius of the shaft 14 at the center (axially) of the machine is smaller than that at each end of the machine.

The rotor shaft 14 is also provided with a plurality of through holes 36 at each end (axially) of the machine. The through holes 36 may, for example, be formed by drilling into the rotor. The through holes 36 allow fluid communication between the hollow interior 30 of the rotor shaft 14 and the interior of the sealed enclosure formed by the machine housing 20 and end plates 22, 24. Thus, the through holes 36 allow coolant to exit the hollow interior of the rotor shaft, and to contact parts of the stator 12 (in particular, stator end windings 18). The hollow interior 30 forms a single chamber for coolant exiting both ends of the machine.

In this embodiment, the through holes 36 run in a substantially axial direction from inside the inside the hollow interior 30 of the rotor shaft to outside. This avoids the need to extend the rotor axially outwards to underneath the stator windings, and thus helps to minimize the size of the rotor and the rotational mass. However, the through holes may also have a radial component, or run in a substantially radial direction.

Coolant inside the sealed enclosure formed by the housing 20 and end plates 22, 24 falls under gravity to the bottom of the enclosure. The coolant then passes through passageways 38 in the housing 20 and is collected in a sump 40 at the bottom of the machine. A pump 42 is provided to pump coolant from the sump 40 back into the rotor shaft. The pump 42 is operated under control of a control unit 43. Coolant is pumped through a fitter 44 and heat exchanger 46, and back into passageway 34. Coolant from the passageway 34 then flows back into the injection tube 32. Thus, a coolant circuit for circulating coolant through the machine is formed by a combination of the sump 40, pump 42, filter 44, heat exchanger 46, passageway 34, tube 32, hollow interior 30, through holes 36, the sealed enclosure formed by the machine housing 20 and end plates 22, 24, and the passageways 38.

In operation, the machine functions as a motor/generator with the rotor 10 rotating inside the stator 12. Coolant from the sump 40 is pumped by the pump 42 through the filter 44 and the heat exchanger 46, through the passageway 34, and into the injection tube 32. Coolant which has passed through the tube 32 is directed radially outwards by the holes 33 at the end of the tube. The coolant flows radially outwards through the hollow interior 30 of the rotor shaft and reaches the internal surface of the shaft at a position which is roughly central in an axial direction. The flow of coolant is such that the hollow interior 30 does not fill with coolant and instead coolant flows along the internal surface of the shaft. The speed of the pump 42 is controlled to ensure that the appropriate amount of coolant is injected by the injection tube 32, taking into account operating conditions such as speed of rotation of the rotor.

As the rotor shaft 14 rotates, the internal taper of the shaft causes the coolant to flow from the center axially outwards along the internal surface of the shaft towards the two ends of the machine under centrifugal force. Coolant flows from the center axially outwards in each direction, and thus, the flow of coolant in the shaft is bi-directional. The flow of coolant through the shaft causes heat energy to be conducted away from the interior of the rotor, thus cooling the rotor.

Coolant which has flowed through the rotor shaft gathers at each end, axially, of the machine. The gathered coolant is then forced outwards through the through holes 36 under centrifugal force. Coolant which has passed through the through holes 36 is then flung radially outwards under centrifugal force. This causes the coolant to be distributed onto the radially inwards surfaces of the stator end windings 18 at each end of the machine. This provides cooling of the end windings and other parts of the stator at both ends of the machine. Coolant is then recirculated through the sump 40, pump 42, filter 44, heat exchanger 46 and passageway 34 in a closed loop before being injected/sprayed into the rotor shaft once again. The paths taken by the coolant are shown by the arrows in FIG. 1. With a continuous flow of coolant, there is continuous flow of heat energy taken from the rotor and the stator end windings.

In this embodiment, the pump 42 is an external pump which is driven electrically by a separate motor. The speed of the pump 42 is controlled by the control unit 43 to ensure that the appropriate amount of coolant is injected into the hollow interior of the rotor shaft. The control unit 43 may receive inputs from various sensors 45, such as sensors which monitor the speed, load and/or temperature of the electrical machine and/or the level of coolant in the sump or the flow of coolant, and may control the speed of the pump 42 in dependence thereon. The filter 44 is used to filter particles from the liquid coolant. The heat exchanger 46 is used to remove heat from the coolant.

In alternative embodiments, it would be possible for the pump to be driven mechanically, for example by the rotor shaft 14, and/or for the pump to be located internally within the machine enclosure. Furthermore, if desired, either or both of the filter and the heat exchanger could be removed or replaced with other components.

In this embodiment, the injection tube extends into the hollow interior to point just over half-way through the machine. Alternatively, it would be possible for the tube to extend the whole way through the machine, so as to be secured at both ends. In this case, the tube may be sealed at a point just past the center (axially) of the machine, and radial holes may be provided through the tube at positions roughly at the center (axially) of the machine.

In this embodiment the coolant is a heat transfer fluid in the liquid phase. The coolant may be a lubricating coolant. This can allow the coolant to contribute to the lubrication of the machine as well as its thermal control. For example, use of a lubricating coolant can allow the bearings 26, 28 to be lubricated. Suitable coolants include engine oils (i.e., oils which are used for lubrication of internal combustion engines) or any other lubricating oil. However, it would be possible for water-based coolants to be used instead. For example, an organic chemical such as glycol (e.g., ethylene glycol, diethylene glycol, or propylene glycol) in water, or any other type of coolant, could be used instead.

The arrangement described above allows a single injection point to be used to inject coolant into the machine. The coolant is injected into the hollow rotor shaft which, when rotating, forces coolant through the rotor shaft to cool the rotor and also expels coolant onto the stator end windings at each end of the machine, cooling the stator. This can allow cooling of the rotor and the stator at both ends of the machine without requiring multiple injection points for the coolant. Thus, this arrangement may provide more even and effective cooling of the machine, without the complexity of multiple cooling passageways and multiple injection points. Furthermore, by removing the need for multiple cooling passageways and multiple injection points it may be possible for the machine to fit within a smaller space envelope.

Figure 2:
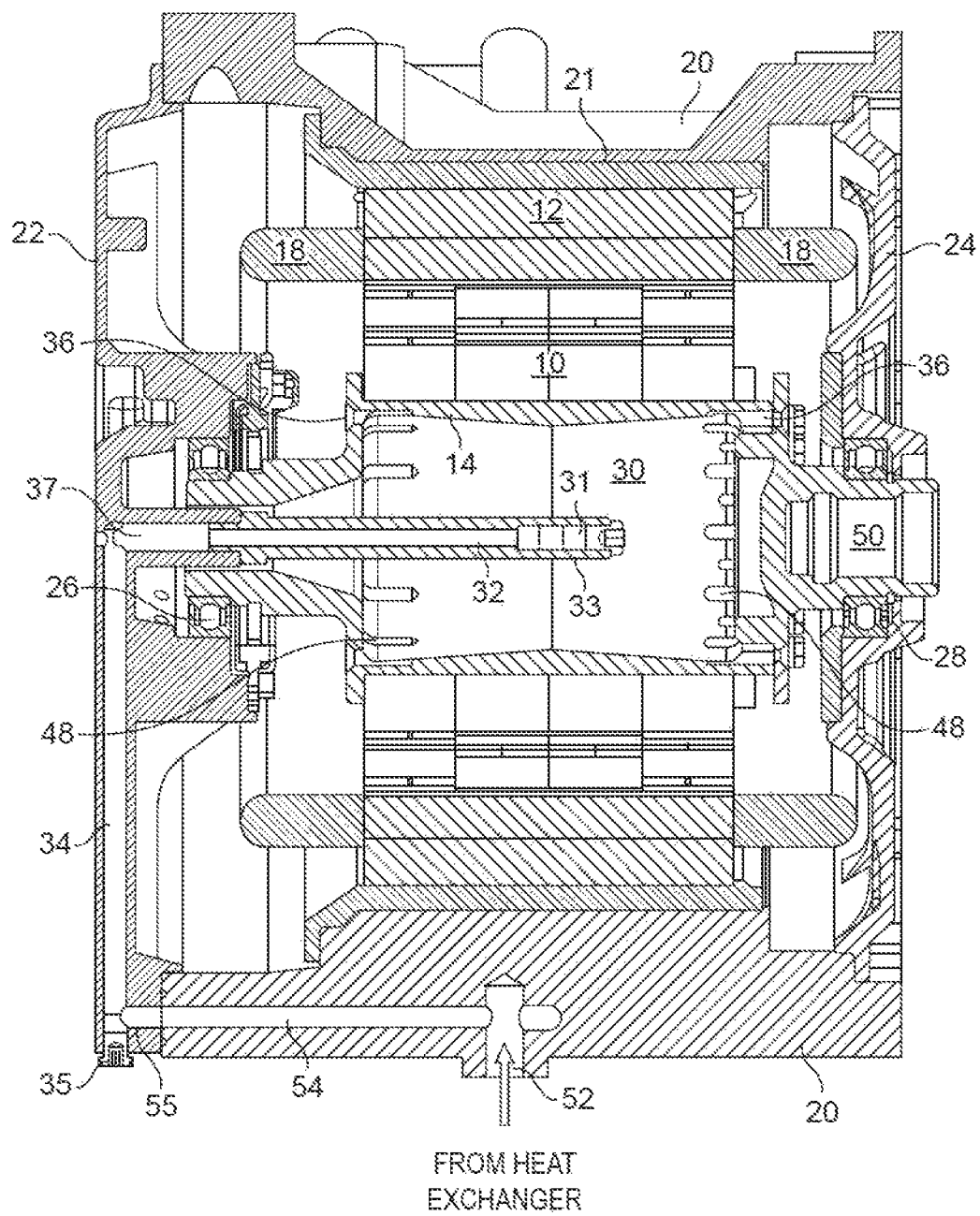
FIG. 2 shows parts of a rotating electrical machine in another embodiment of the disclosure.

FIG. 2 shows parts of a rotating electrical machine in another embodiment of the disclosure. Referring to FIG. 2, the machine comprises rotor 10, stator 12, rotor shaft 14, end windings 18, housing 20, end plates 22, 24, bearings 26, 28, hollow interior 30, injection tube 32, passageway 34, and through holes 36, all of which may be substantially in the form described above with reference to FIG. 1. A sump, pump, control unit, filter and heat exchanger may also be provided in the same way as the arrangement of FIG. 1.

The machine of FIG. 2 is designed to be used as a motor/generator in the drive train of an electric or hybrid electric vehicle. A coupling 50 is provided in the rotor shaft for coupling the machine to a transmission shaft. This allows torque to be transferred between the motor/generator and the vehicle transmission.

In the machine of FIG. 2, a two-part housing arrangement comprising outer housing 20 and inner housing 21 is used, which may facilitate assembly of the machine. The outer housing 20 and inner housing 21 may be manufactured, for example, from a cast metal such as aluminum. The stator 12 is held inside the inner housing 21. The outer housing 20 includes an input port 52 and passageway 54 which are used to receive coolant from the heat exchanger (not shown) and transfer it to the passageway 34. The input port 52 is formed inside the outer housing 20. For example, the input port 52 may be formed by drilling a hole part way into the outer housing 20 in a radial direction. The passageway 54 is also formed inside the outer housing 20. For example, the passageway 54 may be formed by drilling a hole into the outer housing before the end plate 22 is assembled to the outer housing 20. The hole is drilled in an axial direction through the outer housing until it intersects the input port 52. The end plate 22 includes a corresponding axial passageway 55 which is aligned with the passageway 54. The passageway 55 is formed inside the end plate 22. For example, the passageway 55 may be formed by drilling a hole into the end plate 22 before the end plate 22 is assembled to the outer housing 20. The passageway 55 intersects the passageway 34. The passageway 34 is formed inside the end plate 22. For example, the passageway 34 may be formed by drilling a hole in a radial direction through the end plate 22. The radially outwards end of the passageway 34 is sealed with a plug 35. The radially inwards end of the passageway 34 intersects an axial passageway 37 at the center of the machine. The axial passage way runs from the passageway 34 towards the inside of the enclosure. The axial passageway 37 may be formed by drilling a hole in an axial direction part way into the end plate 22 before the end plate 22 is assembled to the outer housing 20. One end of the injection tube 32 is inserted into the axial passageway 37. O-rings are provided in appropriate locations to seal the connections between the outer housing 20 and the end plate 22.

In FIG. 2, the injection tube 32 includes a chamber 31 at the end inside the rotor shaft. The chamber 31 has a slightly larger internal radius than that of the rest of the tube. The chamber 31 helps to reduce pressure loss as the coolant flows through the holes 33 at the end of the tube. Also shown in FIG. 2 are grooves 48 on the inside of the rotor shaft at each end of the hollow interior 30. The grooves 48 run in an axial direction and may taper outwards radially. The grooves 48 lead to the through holes 36. In operation, the grooves 48 guide coolant which has collected at the ends of the hollow interior 30 of the rotor shaft into the through holes 36.

Figure 3:
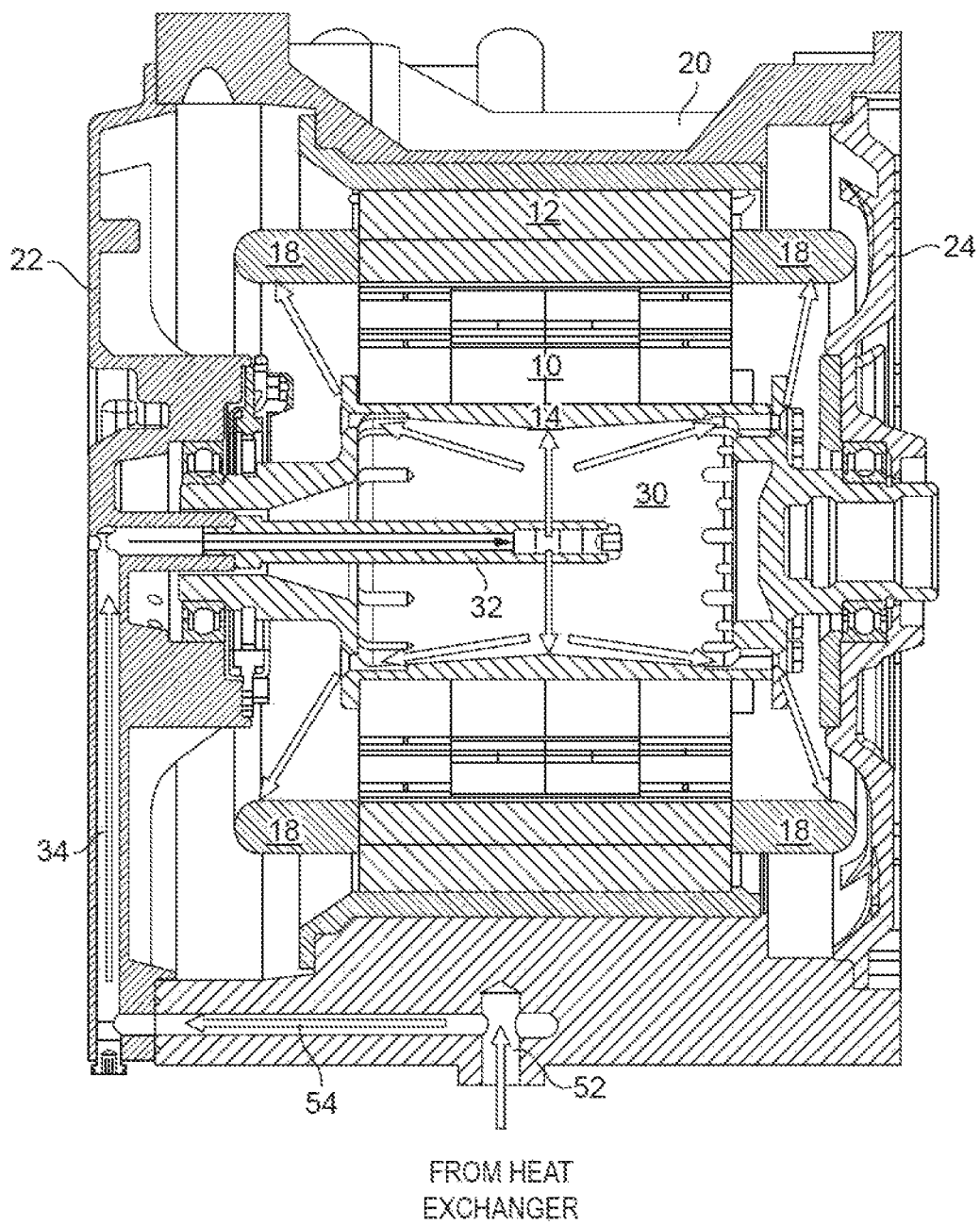
FIG. 3 illustrates the flow of coolant through the machine of FIG. 2.

FIG. 3 illustrates the flow of coolant through the machine of FIG. 2. The paths taken by the coolant are shown by the arrows in FIG. 3. Referring to FIG. 3, coolant enters the port 52 and passes through passageways 54, 55, 34 and 37 to the injection tube 32. Coolant then passes through the tube 32 to the chamber 31 and is directed radially outwards by holes 33 at the end of the tube. The coolant flows radially outwards through the hollow interior 30 of the shaft and reaches the internal surface of the shaft at a position which is roughly central in an axial direction. As the rotor shaft 14 rotates, the internal taper of the shaft causes the coolant to flow outwards along the internal surface towards the two ends of the shaft under centrifugal force. The coolant is collected by the grooves 48 and directed to the through holes 36. The coolant is then forced outwards through the through holes 36 and is then flung radially outwards under centrifugal force. This causes the coolant to be distributed onto the radially inwards surfaces of the stator end windings 18 at each end of the machine. Coolant is then recirculated through holes in the housing to a sump, pump, filter and heat exchanger (not shown) and back to the port 52.

The embodiment of FIGS. 2 and 3 can allow cooling and lubrication of an electrical machine designed for traction applications. The coolant circuit can allow cooling of both the rotor and the stator at both ends of the machine without requiring multiple injection points for the coolant. By removing the need for multiple cooling passageways and multiple injection points it may be possible for the machine to fit within a smaller space envelope. In addition, the coolant can be introduced through the inlet port 52 from a radially outwards side of the machine, which may help to minimize the axial length of the machine. This may be particularly advantageous in traction applications where space may be at a premium. Furthermore, some or all of the input port 52 and passageways 34, 37, 54, 55 may be formed by drilling into the outer housing 20 and/or end plate 22 after they have been made. This may simplify the manufacturing process by avoiding the need for complex passageways to be formed, for example, during casting.

Figure 4:
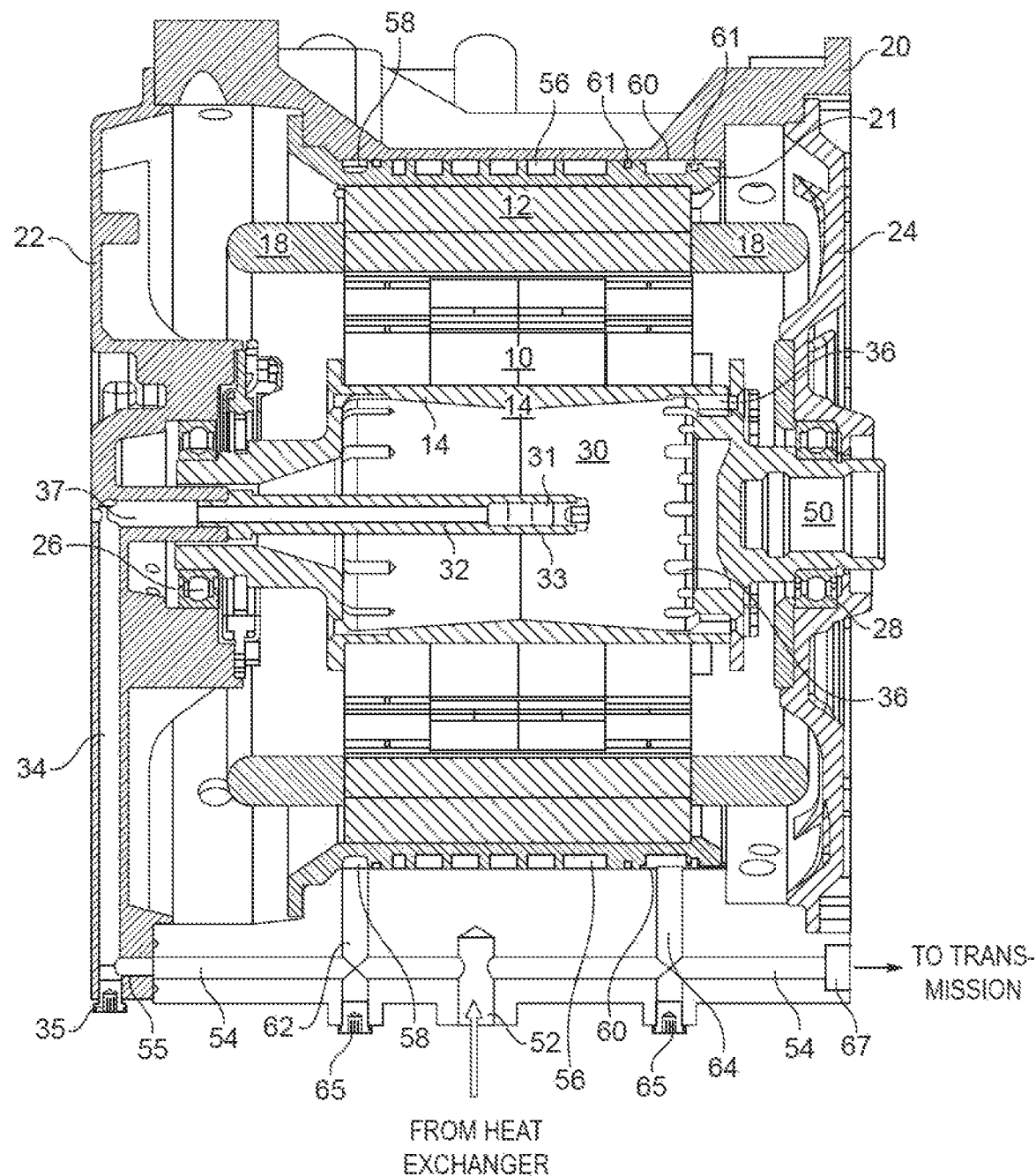
FIG. 4 shows parts of a rotating electrical machine in another embodiment of the disclosure.

FIG. 4 shows parts of a rotating electrical machine in another embodiment of the disclosure. Referring to FIG. 4, the machine comprises rotor 10, stator 12, rotor shaft 14, end windings 18, outer housing 20, inner housing 21, end plates 22, 24, bearings 26, 28, hollow interior 30, injection tube 32, through holes 36, input port 52 and passageways 34, 37, 54, 55 all of which may be substantially in the form described above with reference to FIGS. 1 to 3. A sump, pump, control unit, filter and heat exchanger may also be provided in the same way as the arrangement of FIG. 1.

In the machine of FIG. 4, a two-part housing arrangement comprising outer housing 20 and inner housing 21 is used, as in the machine of FIG. 2. However, in the machine of FIG. 4, a cooling channel 56 is provided between the outer housing 20 and the inner housing 21. The cooling channel 56 is created by forming a groove on the outer surface of the inner housing 21. When the outer housing 20 and inner housing 21 are brought together, the cooling channel 56 is formed by the gap between the two housings left by the groove. The groove may be formed, for example, by machining the outer surface of the inner housing 21. Alternatively, it would be possible for the groove to be formed in the inner surface of the outer housing 22, or in both housings. In this example, the cooling channel 56 is a helical channel which turns around the machine's circumference while moving parallel to the axis. The cooling channel 56 is part of a separate coolant circuit and is used to carry a coolant such as oil or a water/glycol mix around the outside of the machine. The separate coolant circuit may comprise a pump, heat exchanger and control unit in a manner known in the art. This allows heat to be drawn from the inside to the outside of the machine.

In the embodiment of FIG. 4, two separate coolant distribution channels 58, 60 are also created between the inner housing 21 and the outer housing 20. The coolant distribution channels 58, 60 run circumferentially around the outside of the machine. Each coolant distribution channel 58, 60 is created by forming a circumferential groove on the outer surface of the inner housing 21. The groove may be formed, for example, by machining the outer surface of the inner housing 21. Alternatively, it would be possible for the channel to be formed on the inner surface of the outer housing 20, or on both housings. When the outer housing 20 and inner housing 21 are brought together, the coolant distribution channels 58, 60 are formed by the gaps between the two housings left by the grooves. O-rings 61 are provided to seal the coolant distribution channels 58, 60 when the two housings 20, 21 are brought together.

The outer housing 20 also includes two radial passageways 62, 64 which are connected to the coolant distribution channels 58, 60. The passageways 62, 64 may be formed by drilling through the outer housing 20 in a radial direction before the outer housing 20 and the inner housing 21 are brought together. The radially outwards ends of the passageways 62, 64 are sealed with respective plugs 63, 65. In this embodiment, the passageway 54 extends axially from one end of the outer housing 20 to the other. The passageways 62, 64 intersect the passageway 54. Thus, the two passageways 62, 64 connect the coolant distribution channels 58, 60 to the coolant being introduced through the input port 52 via passageway 54. The coolant distribution channels 58, 60 are therefore connected to the same coolant circuit as the rotor shaft 14 and the stator end windings 18. The coolant distribution channels 58, 60 are connected to outlets such as nozzles (not shown) which spray coolant onto the radially outwards sides of the stator end windings. This can allow both sides of the stator windings to be cooled using the same coolant circuit.

In the arrangement of FIG. 4, the passageway 54 extends axially through the outer housing 20 to a port 67 at an end of the machine which is arranged to connect to a transmission. The port 67 can allow the coolant circuit to be connected to the transmission. This can allow the transmission to be cooled and/or lubricated using the same coolant circuit as the electrical machine.

In operation, the machine of FIG. 4 operates in a similar way to that of FIGS. 1 to 3. Thus, coolant enters the port 52 and passes through passageways 54, 55, 34 and 37, through injection tube 32, through the hollow interior 30 of the shaft, through the through holes 36, and outwards towards the stator windings 18. The coolant is then recirculated through holes in the housing to a sump, pump, filter and heat exchanger (not shown) and back to the port 52. Coolant also passes from passageway 54 to passageways 62, 64 to the coolant distribution channels 58, 60. Coolant is distributed circumferentially around the machine though the coolant distribution channels 58, 60 and sprayed onto the radially outwards sides of the stator end windings 18, before returning to the sump. In addition, coolant is circulated through the transmission (not shown). This can allow different parts of the machine and other parts of the drivetrain to be cooled using the same coolant circuit.

By forming the coolant distribution channels 58, 60 between the inner and outer housings, and connecting them to the same coolant circuit as the rotor shaft via the passageways 62, 64, it is possible to cool both sides of the stator windings using a singe coolant injection point, and without the complexity of multiple cooling passageways. Furthermore, by drilling some or all of the input port 52 and passageways 34, 37, 54, 55, 62, 64 through the outer housing 20 and/or end plate 22, manufacturing may be simplified.

It will be appreciated that other parts of the machine, or other associated components, could also be cooled as part of the coolant circuit in a similar way. For example, the cooling channel 56 could be connected to the same coolant circuit and carry the same coolant as the rotor shaft 14 and the stator end windings 18. This may allow the outside of the stator 12 to be cooled without the need to provide a separate coolant circuit.

Alternatively, if desired, it would be possible for the transmission and/or other parts of the machine to be cooled using separate coolant circuits and/or separate coolants.

Figure 5:
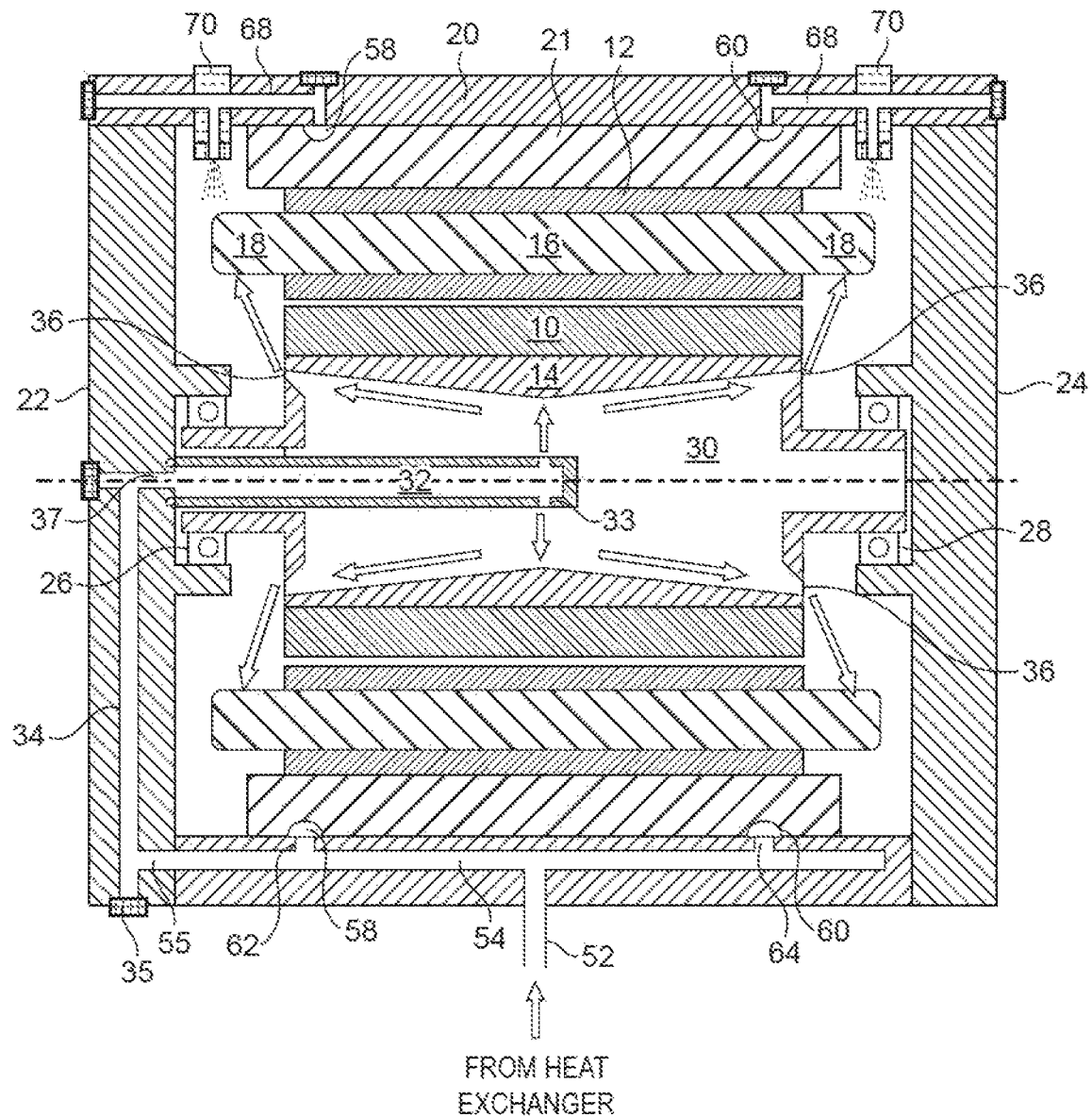
FIG. 5 shows parts of a rotating electrical machine in another embodiment of the disclosure.

FIG. 5 shows parts of a rotating electrical machine in another embodiment of the disclosure. Referring to FIG. 5, the machine comprises rotor 10, stator 12, rotor shaft 14, end windings 18, outer housing 20, inner housing 21, end plates 22, 24, bearings 26, 28, hollow interior 30, injection tube 32, through holes 36, input port 52 and passageways 34, 37, 54, 55, all of which may be substantially in the form described above with reference to FIGS. 1 to 4. A sump, pump, control unit, filter and heat exchanger may also be provided in the same way as the arrangement of FIG. 1.

In the embodiment of FIG. 5, two coolant distribution channels 58, 60 are formed between the inner housing 21 and the outer housing 20, in a similar way to the arrangement of FIG. 4. The coolant distribution channels 58, 60 run 360° circumferentially around the outside of the machine. The coolant distribution channels 58, 60 are connected to the coolant circuit by means of passageways 54, 62, 64. The coolant distribution channels 58, 60 are also connected to axial passageways 66, 68 in the outer housing 20. The axial passageways 66, 68 run axially from the coolant distribution channels 58, 60 towards the outside of the machine. The passageways 66, 68 are connected to nozzle assemblies 70. In this embodiment, a plurality of axial passageways 66, 68 and nozzle assemblies 70 are provided at spaced locations circumferentially around the machine at each end. Each nozzle assembly 70 is located radially outwards of the stator end windings 18 and has a nozzle facing a radially outwards surface of the end windings.

In operation, coolant enters the port 52 and passes through passageways 54, 55, 34 and 37, through injection tube 32, through the hollow interior 30 of the shaft, through the through holes 36, and outwards towards the radially inwards side of the stator end windings 18. Coolant also passes from passageway 54 through passageways 62, 64 to the coolant distribution channels 58, 60. Coolant is distributed circumferentially around the outside of the machine though the coolant distribution channels 58, 60. Coolant from the coolant distribution channels 58, 60 flows axially outwards through the axial passageways 66, 68 to the nozzle assemblies 70. Coolant entering the nozzle assemblies 70 is sprayed radially inwards in the direction of an outer surface of the stator end windings 18. The coolant is then recirculated through holes in the housing to a sump, pump, filter and heat exchanger (not shown) and back to the input port 52.

The arrangement of FIG. 5 can allow both sides of the stator end windings to be cooled using the same coolant circuit. Furthermore, this may be achieved using a single inlet (input port 52) and without the need for multiple passageways through the machine. By removing the need for multiple cooling passageways and multiple injection points it may be possible for the machine to fit within a smaller space envelope. This may be particularly advantageous for traction applications.

If desired, a separate coolant circuit could be provided to carry another coolant around the outside of the machine, in a similar way to the cooling channel 56 of FIG. 4.

Figure 6:
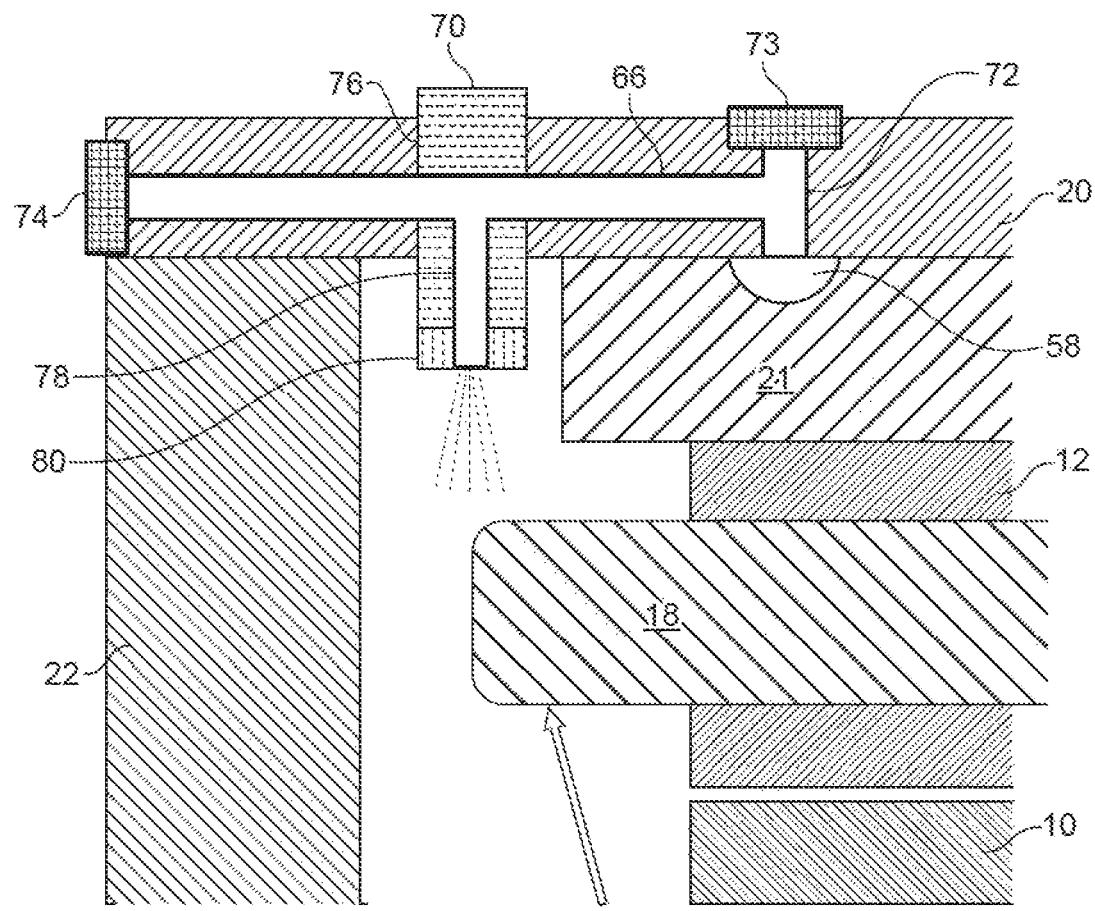
FIG. 6 shows parts for cooling an outer surface of stator end windings in one embodiment.

FIG. 6 shows in more detail parts for cooling an outer surface of the stator end windings in one embodiment. Referring to FIG. 6, the coolant distribution channel 58 is formed by a groove on the outer surface of the inner housing 21 which creates a channel when the outer housing 20 and inner housing 21 are brought together. The coolant distribution channel 58 runs circumferentially around the machine. The coolant distribution channel 58 is connected to a radial passageway 72. The radial passageway 72 may be formed by drilling radially through the outer housing 20 at a location which will intersect with the coolant distribution channel 58. The radially outwards end of the radial passageway 72 is sealed with a plug 73. The radial passageway 72 is in fluid communication with the axial passageway 66. The axial passageway 66 may be formed by drilling axially into the outer housing 20 from an axially outwards end of the outer housing up to the radial passageway 72. The axially outwards end of the axial passageway 66 is sealed with a plug 74. A radial hole 76 is formed through the outer housing 20 at a location which is radially outwards of the stator end windings 18 and which intersects the axial passageway 66. The radial hole 76 may be formed by drilling through the outer housing 20. The nozzle assembly 70 is located inside the hole 76. The inner housing 21 stops short of the end plate 22 in an axial direction, and the nozzle assembly 70 passes in a radial direction at least partially through a gap between the inner housing 21 and the end plate 22. The nozzle assembly 70 includes a T-shaped internal passageway 78. The T-shaped passageway 78 connects with the axial passageway 66 and with a nozzle 80. The nozzle 80 faces radially inwards, towards an outer surface of the stator end windings 18. The nozzle 80 is arranged to spray the coolant in the direction of the stator end windings 18.

In operation, coolant from the coolant distribution channel 58 flows through the radial passageway 72 to the axial passageway 66 and then axially outwards to the nozzle assembly 70. The nozzle assembly 70 diverts the coolant radially inwards through the internal passageway 78 towards the nozzle 80. Coolant exiting the nozzle 80 is sprayed radially inwards in the direction of an outer surface of the stator end windings 18.

An advantage of the arrangement of FIGS. 5 and 6 is that the axial passageway 66 and the radial passageway 72 can be formed by drilling through the outer housing 20 and then sealing them with the plugs 73, 74. Similarly, the radial hole 76 may be formed by drilling through the outer housing. This avoids the need to create complex passageways during manufacture of the housing. If desired, the nozzle assembly 70 could be used to seal the axial passageway 66. Instead of or as well as the plug 74.

It will be appreciated that a similar arrangement may be provided at the other end of the machine, to allow the stator windings to be cooled at both ends.

Figure 7:
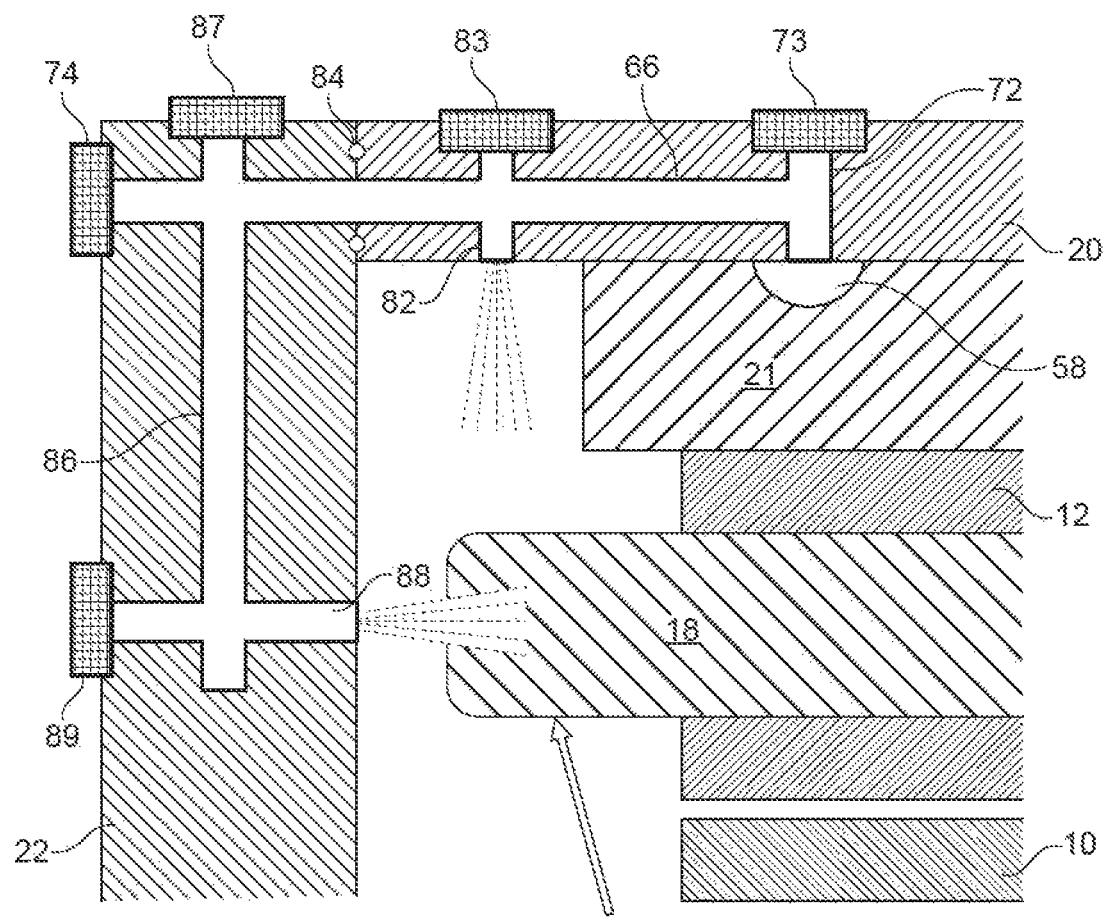
FIG. 7 shows parts for cooling an outer surface of stator end windings in another embodiment.

FIG. 7 shows parts for cooling an outer surface of the state windings in another embodiment. Referring to FIG. 7, in this embodiment, the coolant distribution channel 58 is connected to radial passageway 72 and the radial passageway 72 is connected to axial passageway 66 in a similar way to the arrangement of FIG. 6. However, in the embodiment of FIG. 7, rather than using a nozzle assembly, a further radial passageway 82 is provided through the outer housing 20. The radial passageway 82 is located radially outwards of the stator end windings 18 and intersects with the axial passageway 66. The radially outwards end of the radial passageway 82 is seal with a plug 83. The radially inwards end of the radial passageway 82 opens towards an outer surface of the stator end windings 18. The further radial passageway 82 may be formed by drilling radially through the outer housing 20.

In the arrangement of FIG. 7, the end plate 22 abuts an axially outwards end of the outer housing 20. A gap is left in an axial direction between the inner housing 21 and the end plate 22. The axial passageway 66 extends from the outer housing 20 and through the end plate 22 in an axial direction. O-rings 84 are used to provide a seal between the outer housing 20 and the end plate 22. The end of the axial passageway 66 is sealed with a plug 74. A further radial passageway 86 is provided through the end plate 22. The radial passageway 86 intersects the axial passageway 66. The radially outwards end of the radial passageway 86 is sealed with a plug 87. The radial passageway 86 extends radially inwards to a position approximately adjacent the stator end windings 18. A further axial passageway 88 is provided through the end plate 22 at a location in a radial direction which is approximately aligned with the stator end windings 18. The axially outwards end of the axial passageway 88 is sealed with a plug 89. The axially inwards end of the axial passageway 88 opens towards the axially outwards end of the stator end windings 18. The radial passageway 86 and the axial passageway 88 as well as the portion of the axial passageway 66 passing through the end plate 22 may all be formed by drilling the appropriate holes in the end plate.

In operation, coolant from the coolant distribution channel 58 flows through the radial passageway 72 to the axial passageway 66 and then axially outwards to the radial passageway 82. The radial passageway 82 diverts some of the coolant flowing through the axial passageway 66 radially inwards towards the opening of the passageway on the inside of the outer housing. Coolant exiting the radial passageway 82 through the opening passes through the gap between the inner housing 21 and the end plate 22 and is allowed to spray/trickle/drip onto the radially outwards surface of the stator end windings 18. The rest of the coolant flowing through the axial passageway 66 continues through the rest of the axial passageway 66, through the radial passageway 86 and then through the axial passageway 88. The coolant then exits the axial passageway 88 towards the axially outwards end of the stator end windings 18.

A plurality of passageways 72, 66, 82, 86, 88 may be provided at spaced locations (for example, 60°) circumferentially around the machine, in order to allow the stator end windings 18 to be cooled at a plurality of locations.

The arrangement of FIG. 7 can allow coolant to spray/trickle/drip onto the radially outwards surface and the axially outwards surface of the stator end windings without requiring the complexity of a nozzle assembly.

It will be appreciated that the features of FIGS. 6 and 7 could be used in any appropriate combination. For example, an axial passageway could be used instead of the nozzle assembly in the arrangement of FIG. 6. As another example, a nozzle assembly could be used instead of the radial passageway 82 and/or the axial passageway 88 in the arrangement of FIG. 7. If desired, the coolant could be directed towards the axially outwards end of the stator end windings only. In this case, the radial passageway 82 and plug 83 could be omitted from the arrangement of FIG. 7.

In any of the embodiments described above, the speed of the pump used to inject coolant into the hollow interior of the rotor shaft and elsewhere in the machine may be controlled in dependence on the operating conditions of the machine. For example, the amount of coolant injected may be increased as the speed of the rotating electrical machine increases, and vice versa. The speed of the pump may also be controlled in dependence on the load applied to the electrical machine. Thus, more coolant may be injected as the load on the machine increases, and vice versa. This can allow the amount of heat transferred to the coolant to increase as the load on the machine, and thus the heat generated by the machine, increases. For example, in the case of traction applications, a coolant boost mode could be provided for acceleration/overtaking. If desired, other factors such as the temperature of the machine and/or ambient temperature and/or level of coolant in the sump could be taken into account as well or instead.

The various arrangements described above can allow cooing of both the rotor and the stator at both ends of the machine using the same coolant circuit. Thus, these arrangements may provide more even and effective cooling of the machine than previously considered cooling techniques. Furthermore, the disclosed arrangements may allow the machine to fit within a smaller space envelope. The principles described above may also be used in combination with other space saving techniques such as the use of hairpin type stator windings to enable greater performance in a smaller space envelope.

Embodiments of the present disclosure have been described by way of example only, and variations in detail will be apparent to the skilled person. For example, rather than passageways through the machine housing, external pipes could be used to bring coolant to various parts of the machine such as the injection tube, the cooling channel in the machine housing and/or the transmission. If desired, further injection points could be provided for injecting coolant into the machine at different locations. Rather than an external pump, an internal pump driven by the shaft, or any other type of pump, could be used instead. If desired, one or more of the sump, filter and heat exchanger could be dispensed with or replaced by other components. Rather than using an enclosure comprising a housing and two end plates, two cup-shaped housings could be used, or any other appropriate enclosure configuration could be used. Furthermore, details of the electrical machine itself have been given by way of example, and it will be appreciated that the techniques described above can be used with other types of electrical machine having a different construction. Other modifications in detail will be apparent to the skilled person within the scope of the claims.

What is claimed is:

1. A rotating electrical machine comprising:
   a stator comprising a stator core and stator end windings extending out of the stator core at each end of the machine;
   a rotor arranged to rotate inside the stator;
   a rotor shaft, the rotor shaft having a hollow interior;
   a coolant circuit arranged to circulate coolant through the machine; and
   a machine enclosure;
   wherein the coolant circuit comprises an injection tube arranged to introduce coolant into the hollow interior of the rotor shaft,
   wherein the hollow interior of the rotor shaft comprises an internal surface with a taper, wherein coolant flows along the internal surface and exits the hollow interior of the rotor shaft at each end of the machine and is propelled outwards towards the stator end windings,
   the machine enclosure comprises a passageway for supplying coolant to the injection tube, and
   wherein the internal surface tapers radially outwards in a direction from the center of the machine towards the ends of the machine axially;
   such that an internal radius of the shaft at an axial center of the machine is smaller than that at each end of the machine,
   such that coolant is propelled from the center of the machine towards each end of the machine under centrifugal force.

2. The machine of claim 1, wherein the injection tube is arranged to introduce coolant into the center, axially, of the hollow interior of the rotor shaft.

3. The machine of claim 1, wherein the injection tube is located at the center of the machine radially.

4. The machine of claim 1, wherein the injection tube is connected to part of the machine enclosure.

5. The machine of claim 1, wherein the injection tube comprises at least one outlet which is arranged to direct coolant radially outwards into the hollow interior of the shaft.

6. The machine of claim 1, wherein an air gap is provided between the injection tube and the internal surface.

7. The machine of claim 1, wherein the rotor shaft comprises at least one through hole from the hollow interior to outside the shaft at each end of the machine.

8. The machine of claim 7, wherein the at least one through hole runs in a substantially axial direction.

9. The machine of claim 1, wherein the machine enclosure comprises a housing and an end plate and at least part of the passageway runs in a substantially radial direction through the end plate.

10. The machine of claim 1, wherein the machine enclosure comprises at least one coolant distribution channel for distributing coolant to other parts of the machine.

11. The machine of claim 10, wherein the at least one coolant distribution channel is part of the same coolant circuit as the injection tube.

12. The machine of claim 10, wherein the at least one coolant distribution channel runs circumferentially around the machine.

13. The machine of claim 10, wherein the machine enclosure comprises an outer housing and an inner housing, and the at least one coolant distribution channel is formed between the outer housing and the inner housing.

14. The machine of claim 10, further comprising a plurality of outlets in fluid communication with the at least one coolant distribution channel, wherein the plurality of outlets are arranged to direct coolant towards at least one of a radially outwards surface of the stator end windings and an axially outwards end of the stator end windings.

15. The machine of claim 1, wherein at least one passageway is at least partially formed by drilling through the machine enclosure.

16. The machine of claim 1, wherein the coolant circuit comprises at least one of:
   a sump arranged to collect coolant which has circulated through the machine;

a pump arranged to pump coolant through the machine;
a control unit arranged to control a pump;
a filter arranged to filter contaminants from the coolant; and
a heat exchanger arranged to remove heat from the coolant.

17. A method of cooling a rotating electrical machine, the machine comprising a stator with a stator core and stator end windings extending out of the stator core at each end of the machine, a rotor, a rotor shaft, the rotor shaft having a hollow interior comprising an internal surface with a taper such that the internal surface tapers radially outwards in a direction from the center of the machine towards the ends of the machine axially, such that an internal radius of the shaft at an axial center of the machine is smaller than that at each end of the machine, a coolant circuit for circulating coolant through the machine, and a machine enclosure, the method comprising:
   introducing coolant into the hollow interior of the rotor shaft through an injection tube;
   causing coolant to flow along the internal surface of the hollow interior of the rotor shaft, to exit the hollow interior at each end of the machine, and to be propelled outwards from the center of the machine towards each end of the machine and the stator end windings under centrifugal force; and
   supplying coolant to the injection tube through a passageway in the machine enclosure.

* * * * *